United States Patent
Roh et al.

(10) Patent No.: US 9,243,959 B2
(45) Date of Patent: Jan. 26, 2016

(54) INFRARED DETECTOR INCLUDING BROADBAND LIGHT ABSORBER

(71) Applicant: Samsung Electronics Co., Ltd., Suwon-Si, Gyeonggi-Do (KR)

(72) Inventors: Sook-young Roh, Suwon-si (KR); Sung-hyun Nam, Yongin-si (KR); Hae-seok Park, Yongin-si (KR); Seok-ho Yun, Hwaseong-si (KR); Hyun-gue Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 94 days.

(21) Appl. No.: 14/105,469

(22) Filed: Dec. 13, 2013

(65) Prior Publication Data

US 2014/0175284 A1 Jun. 26, 2014

(30) Foreign Application Priority Data

Dec. 20, 2012 (KR) ........................ 10-2012-0149753

(51) Int. Cl.
*G01J 5/20* (2006.01)
*G01J 5/08* (2006.01)
*G01J 5/02* (2006.01)

(52) U.S. Cl.
CPC ................. *G01J 5/20* (2013.01); *G01J 5/0853* (2013.01); *G01J 5/023* (2013.01)

(58) Field of Classification Search
CPC ........ G01J 5/023; G01J 5/0853; G01J 5/0225
See application file for complete search history.

(56) References Cited

U.S. PATENT DOCUMENTS

| | | | | |
|---|---|---|---|---|
| 5,773,831 A | * | 6/1998 | Brouns | 250/370.08 |
| 6,198,099 B1 | * | 3/2001 | Kim | 250/338.1 |
| 6,690,014 B1 | * | 2/2004 | Gooch et al. | 250/338.4 |
| 7,622,717 B2 | * | 11/2009 | Skidmore et al. | 250/338.1 |
| 2011/0204231 A1 | | 8/2011 | Razansky et al. | |
| 2011/0304005 A1 | | 12/2011 | Brueckl et al. | |
| 2013/0112876 A1 | | 5/2013 | Nam et al. | |
| 2013/0146773 A1 | * | 6/2013 | Ouvrier-Buffet et al. | 250/349 |
| 2014/0226021 A1 | * | 8/2014 | Koechlin et al. | 348/165 |

FOREIGN PATENT DOCUMENTS

| KR | 10-1183972 B1 | 9/2012 |
|---|---|---|
| KR | 2013-0072806 A | 7/2013 |

* cited by examiner

*Primary Examiner* — Mark R Gaworecki
*Assistant Examiner* — Kenneth J Malkowski
(74) *Attorney, Agent, or Firm* — Harness, Dickey & Pierce, P.L.C.

(57) ABSTRACT

An infrared detector capable of detecting an infrared spectrum having a wide bandwidth using a broadband light absorber. The infrared detector including a substrate, a light absorber disposed apart from the substrate at a distance, and a pair of thermal legs configured to support the light absorber such that the light absorber is spaced apart from the substrate by the distance. The light absorber includes at least one thermistor layer having a resistance value that varies according to temperature and at least two resonator layers disposed on at least one of upper and lower surfaces of the at least one thermistor layer.

22 Claims, 4 Drawing Sheets

INFRARED DETECTOR INCLUDING BROADBAND LIGHT ABSORBER

CROSS-REFERENCE TO RELATED APPLICATIONS

This application claims the benefit of Korean Patent Application No. 10-2012-0149753, filed on Dec. 20, 2012, in the Korean Intellectual Property Office, the disclosure of which is incorporated herein in its entirety by reference.

BACKGROUND

1. Field

Example Embodiments relate to an infrared detector, and more particularly, to an infrared detector that is capable of detecting a wide bandwidth infrared spectrum.

2. Description of the Related Art

According to a principle of black body radiation, an object radiates a broadband electromagnetic wave that peaks at a specific wavelength according to a temperature. For example, an object radiates an infrared ray having a peak in a wavelength band at about 10 μm at room temperature. Bolometers are tools that absorb electromagnetic waves having an infrared (or terahertz) wavelength band radiated according to the black body radiation principle. The bolometer is configured to convert the absorbed electromagnetic waves into heat and then detect a temperature change due to the heat to measure radiation energy therearound.

Recently, in the development of micro electro mechanical system (MEMS) technologies, thermal imaging cameras in which a plurality of microbolometers are arranged in a two-dimensional array to acquire thermo images are being designed. To realize a high-resolution thermal camera having high temperature accuracy, a small-size pixel may be required. However, in a case where Salisbury screen type bolometers are used, in which a ground plate and a heat absorber are disposed at an interval of about λ/4 (where, λ is a centroid wavelength of an infrared wavelength band to be detected), when the pixel decreases in size, an energy amount incident into the pixel may be reduced. This reduction in incident energy may result in decreased absorption of heat resulting in a decrease in a temperature variation and a signal-to-noise ratio.

Lately, the use of bolometers using localized surface plasmon resonance (LSPR) is being proposed instead of using Salisbury screen type bolometers. Surface plasmon refers to a type of electromagnetic wave generated due to charge density oscillation of electrons that occurs on a surface of a metal. Bolometers using a plasmonic absorber may overcome limitations with respect to low absorption and low signal-to-noise ratio due to the LSPR.

However, since the plasmonic absorber may have relatively narrow bandwidth, it is difficult to effectively absorb heat in an entirety of the infrared region from about 8 μm to about 14 μm which is typically used for acquiring thermo images. Thus, various methods for increasing the resonance bandwidth of the plasmonic absorber are being proposed. For example, materials constituting the absorber may be substituted, or a plurality of resonators having different sizes may be disposed within one unit pixel.

SUMMARY

Example embodiments relate to an infrared detector capable of detecting an infrared spectrum having a wide bandwidth.

Additional aspects will be set forth in part in the description which follows and, in part, will be apparent from the description, or may be learned by practice of the example embodiments In one embodiment, the infrared detector may include a substrate; and a light absorber disposed apart from the substrate at a distance; and a pair of thermal legs configured to support the light absorber such that the light absorber is spaced apart from the substrate by the distance, the light absorber including, at least one thermistor layer having a resistance value that varies according to a temperature, at least two resonator layers disposed on at least one of an upper surface and a lower surface of the at least one thermistor layer, and an insulation layer disposed between the at least one thermistor layer and each of the at least two resonator layers.

In one embodiment, the infrared detector may further include a reflective plate disposed on a surface of the substrate such that the reflective plate faces the light absorber, the reflective plate configured to reflect incident electromagnetic waves.

In one embodiment, the infrared detector may further include a pair of support members that vertically protrude from the substrate, wherein first ends of the pair of thermal legs are respectively connected in a cantilever shape to upper portions of the pair of support members, and second ends of the pair of thermal legs are respectively connected to the light absorber.

In one embodiment, the pair of thermal legs may be respectively connected to at least two sides of the light absorber.

In one embodiment, the at least one thermistor layer is formed of at least one of amorphous silicon, vanadium oxide, nickel oxide, and Si—Ge.

In one embodiment, each of the at least two resonator layers may include a metal thin film formed of one of Gold (Au), Silver (Ag), Platinum (Pt), Copper (Cu), Aluminum (Al), Titanium (Ti), or an alloy thereof.

In one embodiment, a thickness of each of the at least two resonator layers is 10 nm to 100 nm.

In one embodiment, the infrared detector may further include a dielectric layer additionally disposed between the at least one thermistor and each of the at least two resonator layers.

In one embodiment, a thickness of the dielectric layer is 50 nm to 200 nm.

In one embodiment, the light absorber may include one thermistor layer; a first resonator layer disposed on a lower surface of the thermistor layer; a second resonator layer disposed on an upper surface of the thermistor layer; a first insulation layer disposed between the first resonator layer and the thermistor layer; and a second insulation layer disposed between the second resonator layer and the thermistor layer.

In one embodiment, the light absorber may further include a first dielectric layer disposed between the thermistor layer and the first resonator layer; and a second dielectric layer disposed between the thermistor layer and the second resonator layer.

In one embodiment, the at least one thermistor layer and each of the at least two resonator layers have a same shape.

In one embodiment the at least one thermistor layer and each of the at least two resonator layers have different shapes.

In one embodiment, the light absorber may include at least two thermistor layers; and at least two resonator layers stacked alternately with the at least two thermistor layers.

In one embodiment, the light absorber may include a first resonator layer; a first thermistor layer disposed on the first resonator layer; a second resonator layer disposed on the first thermistor layer; a second thermistor layer disposed on the second resonator layer; a third resonator layer disposed on the second thermistor layer; a first insulation layer disposed between the first resonator layer and the first thermistor layer; a second insulation layer disposed between the first thermistor layer and the second resonator layer; a third insulation layer disposed between the second resonator layer and the second thermistor layer; and a four insulation layer disposed between the second thermistor layer and the third resonator layer.

In one embodiment, the light absorber includes one thermistor layer having an upper surface and a lower surface; and at least two resonator layers, a first one of the two resonator layers being stacked on the upper surface and a second one of the at least two resonator layers being stacked on the lower surface.

In one embodiment, the light absorber may further include at least one dielectric layer disposed between the at least two resonator layers.

In one embodiment, the light absorber layer may include an insulation layer disposed on an upper surface of the thermistor layer, a first resonator layer disposed on an upper surface of the insulation layer, a first dielectric layer disposed on the first resonator layer, a second resonator layer disposed on the first dielectric layer, a second dielectric layer disposed on the second resonator layer, and a third resonator layer disposed on the second dielectric layer.

The at least two resonator layers may have a same thickness.

The at least two resonator layers may have different thicknesses.

The at least two resonator layers may have a same shape.

The at least two resonator layers may have different shapes.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
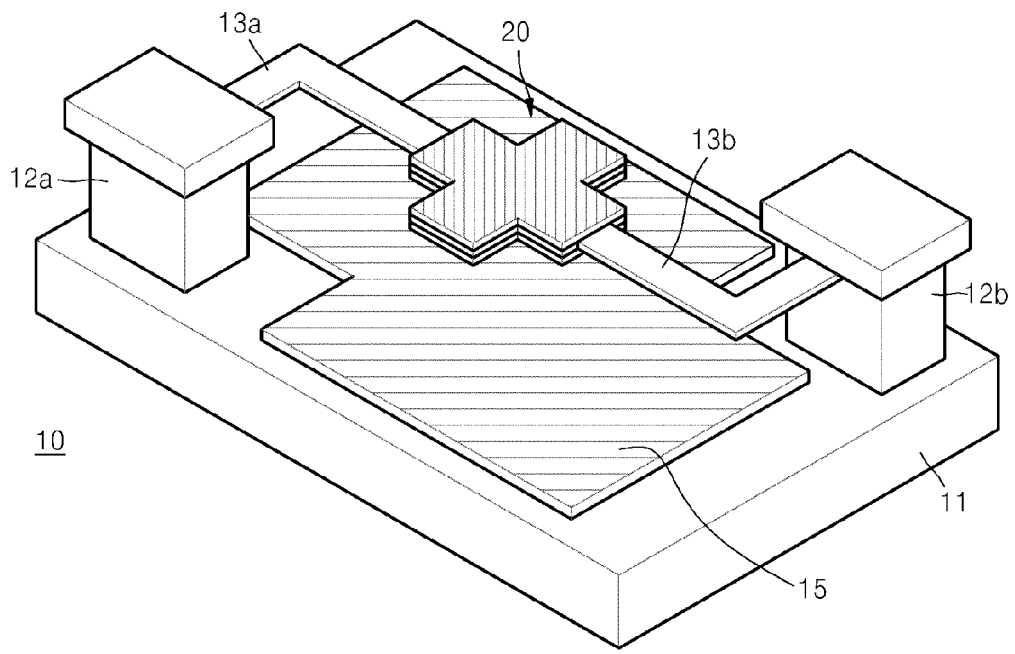
FIG. 1 is a schematic perspective view illustrating a unit pixel of an infrared detector according to an example embodiment.

Hereinafter, example embodiments of an infrared detector including a broadband light absorber will be described in detail with reference to the accompanying drawings. Like reference numerals in the drawings denote like elements. In the drawings, the sizes or thicknesses of elements may be exaggeratedly illustrated for clarity and convenience of description.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Structure of an Infrared Detector

FIG. 1 is a schematic perspective view illustrating one unit pixel of an infrared detector according to an example embodiment.

Referring to FIG. 1, in an infrared detector 10, a unit pixel may include a substrate 11, a pair of support members 12a and 12b protruding from the substrate 11, a light absorber 20 supported by the support members 12a and 12b so that the light absorber 20 is spaced apart from and suspended above the substrate 11, a pair of thermal legs 13a and 13b connecting the support members 12a and 12b to the light absorber 20, and a reflective plate 15 disposed to face the light absorber 20 on a surface of the substrate 11, thereby reflecting incident electromagnetic waves.

Although not shown, a driving circuit for controlling an operation of the infrared detector 10 and reading the intensity of detected infrared rays, an image signal processing circuit for processing an image signal, and various conductive wires may be further disposed on the substrate 11.

The support members 12a and 12b may vertically protrude from the substrate 11 within the unit pixel of the infrared detector 10, for example, in diagonal directions. Each of the thermal legs 13a and 13b may have one end connected to an upper portion of each of the support members 12a and 12b, for example, in a cantilever shape. That is, the first thermal leg 13a may be connected to the first support member 12a so that the first thermal leg 13a is spaced apart from the substrate 11, and the second thermal leg 13b may be connected to the second support member 12b so that the second thermal leg 13b is spaced apart from the substrate 11. Although not shown, each of the thermal legs 13a and 13b may include a conductive lead wire. The lead wires within the thermal legs 13a and 13b may be connected to the driving circuit (not shown) on the substrate 11 via the support members 12a and 12b, respectively.

As will be described later, the thermal legs 13a and 13b may transmit a signal generated in the light absorber 20 into the substrate 11, particularly, the driving circuit disposed on the substrate 11. Also, the light absorber 20 may be connected to the other end of each of the thermal legs 13a and 13b. Thus, the light absorber 20 may be supported to be spaced apart from the substrate 11 by the thermal legs 13a and 13b and the support members 12a and 12b.

The reflective plate 15 may be disposed on the surface of the substrate 11 to face the light absorber 20. The reflective plate 15 may reflect the infrared rays incident into the unit pixel of the infrared detector 10 to increase infrared absorption into the light absorber 20. The reflective plate 15 may be disposed over an entire top surface of the substrate 11. For example, the reflective plate 15 may be a metal thin film formed of, for example, Gold (Au), Silver (Ag), Platinum (Pt), Copper (Cu), Aluminum (Al), Titanium (Ti), or an alloy thereof.

The light absorber 20 absorbs an electromagnetic wave having an infrared (terahertz) wavelength band to be detected to convert the absorbed electromagnetic wave into heat.

Figure 2:
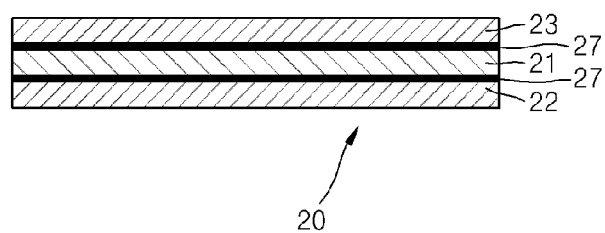
FIG. 2 is a schematic cross-sectional view illustrating a light absorber included in the infrared detector of FIG. 1.

FIG. 2 is a schematic cross-sectional view illustrating an example structure of the light absorber 20 included in the infrared detector.

Referring to FIG. 2, the light absorber 20 may include a thermistor layer 21 that changes in resistance according to a temperature change and at least two resonator layers 22 and 23 having a resonant frequency of an infrared wavelength band to be detected. For example, as shown in FIG. 2, the light absorber 20 may include a first resonator layer 22 disposed on a lower surface of the thermistor layer 21 and a second resonator layer 23 disposed on an upper surface of the thermistor layer 21. Also, an insulation layer 27 may be disposed between each of the resonator layers 22 and 23 and the thermistor layer 21 to electrically insulate the resonator layers 22 and 23 from the thermistor layer 21.

The thermistor layer 21 may be formed of a thermistor material that changes in resistance according to a temperature change. For example, the thermistor layer 21 may be formed of a metal material, a metal oxide, or a semiconductor material, which changes in resistance due to heat, for example, amorphous silicon, vanadium oxide, nickel oxide, GeSbTe (Germanium-Antimony-Tellurium), or Si—Ge. In addition, the thermal legs 13a and 13b may be formed of the same material as that of the thermistor layer 21. In the case where the thermal legs 13a and 13b are formed of the same material as that of the thermistor layer 21, when the infrared detector 10 is manufactured by using a MEMS method, the manufacturing process may be easily performed. However, the thermal legs 13a and 13b may be formed of an insulative dielectric material that is different from that of the thermistor layer 21, such as silicon nitride or silicon oxide.

The resonator layers 22 and 23 may generate surface plasmon resonance (SPR) at an infrared wavelength band to be detected. For this, each of the resonator layers 22 and 23 may be a metal thin film formed of, for example, Au, Ag, Pt, Cu, Al, Ti, or an alloy thereof. Each of the resonator layers 22 and 23 may be patterned in a desired (or alternatively, a predetermined) shape so that the SPR is generated in an infrared wavelength band (e.g., spanning about 8 μm to 14 μm) to be detected. Although FIG. 1 shows that each of the resonator layers 22 and 23 disposed within the unit pixel of the infrared detector 10 have a cross shape, the example embodiments are not limited thereto. For example, the resonator layers 22 and 23 may have various shapes according to a design.

Figure 3:
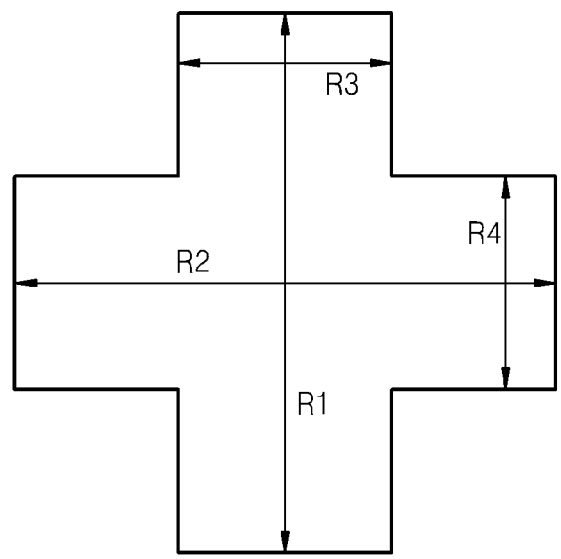
FIG. 3 is a schematic view illustrating a principle in which the light absorber of FIG. 2 has a plurality of resonant frequencies.

FIG. 3 is a schematic view illustrating a principle in which the light absorber of FIG. 2 has a plurality of resonant frequencies; As shown in FIG. 3, a cross-shaped resonator may include at least four resonant parts R1 to R4. Here, relatively strong resonance may occur in the first and second resonant parts R1 and R2. On the other hand, relatively weak resonance may occur in the third and fourth resonant parts R3 and R4. However, as illustrated in the perspective views provided in FIGS. 2 and 4-8, the light absorber 20 includes at least two resonator layers 22 and 23 stacked together. The strong resonance in the first and second resonant parts R1 and R2 allow the infrared detector to absorb light having resonant frequency of the first and second resonant parts R1 and R2. Further, by stacking the two resonator layers 22 and 23 together, even though the third and fourth resonant parts R3 and R4 are relatively weak, each of the third and fourth resonant parts R3 and R4 may have sufficient effective resonance. Therefore, the light absorber 20 may have high detection characteristics in a broadband infrared wavelength.

In contrast, a light absorber that includes only one resonator layer, may be affected predominantly by only the first and second resonant parts R1 and R2. Therefore, unlike a single resonator layer, various resonant modes may effectively occur in the light absorber 20 including the at least two resonator layers 22 and 23.

Although only the third and fourth resonant parts R3 and R4 are illustrated in FIG. 3 as an example, various resonant modes may increase in intensity together to affect the light absorption. Also, various resonant modes may occur in a region between the resonator layers 22 and 23 by an interaction between the at least two resonator layers 22 and 23 that are disposed to face each other.

Figure 4:
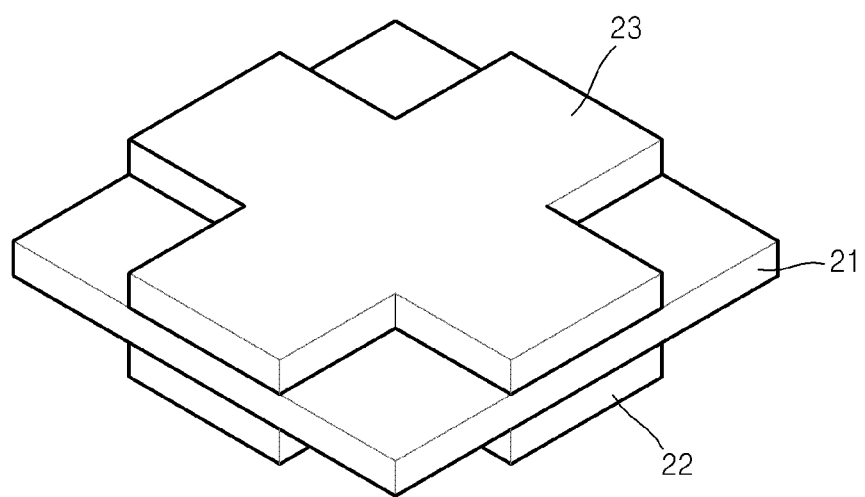
FIGS. 4 and 5 are schematic perspective views of light absorbers according to example embodiments.
Figure 5:
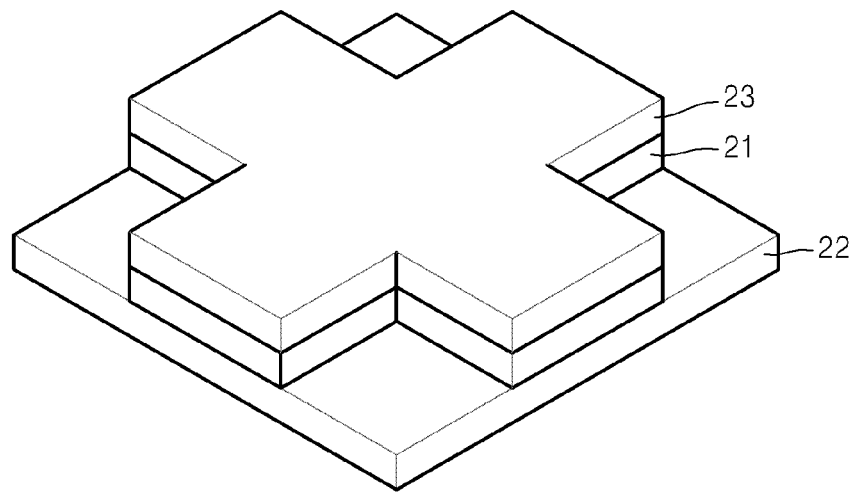

FIGS. 4-5 are schematic perspective views of light absorbers according to example embodiments.

Referring to FIGS. 1, 4 and 5, in FIG. 1, the two resonator layers 22 and 23 and the thermistor layer 21 have the same shape. However, example embodiments are not limited thereto. For example, the thermistor layer 21 that does not directly relate to the resonance may have different shapes.

As shown in FIG. 4, each of the two resonator layers 22 and 23 may have a cross shape. Also, the thermistor 21 may have a rectangular shape, unlike the resonator layers 22 and 23.

Although the thermistor layer 21 having the rectangular shape is illustrated in FIG. 4 as an example, the thermistor layer 21 may have a polygonal shape or a circular shape in addition to the rectangular shape.

As shown in FIG. 5, to increase a detection bandwidth of the light absorber 20, the two resonator layers 22 and 23 may have different shapes. For example, the first resonator layer 22 may have a rectangular shape, and the second resonator layer 23 may have a cross shape. Although the first resonator layer 22 having the rectangular shape is illustrated in FIG. 5 as an example, the first resonator layer 22 may have various shapes according to the detection band of the light absorber 20. For example, the first and second resonator layers 22 and 23 may have the same shape and also may be rotated by about 45 degrees with respect to each other.

Figure 6:
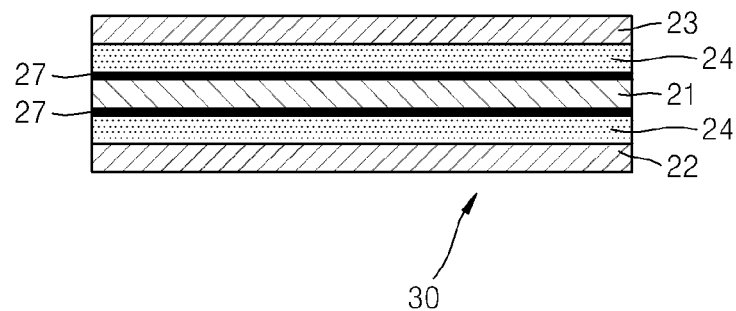
FIGS. 6-8 illustrate cross-sectional views of light absorbers according to example embodiments.
Figure 7:
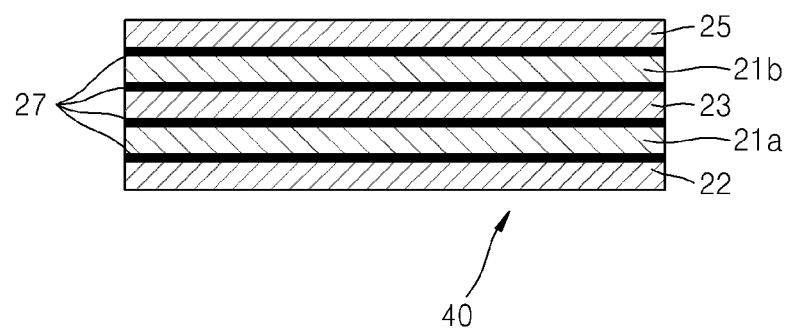
Figure 8:
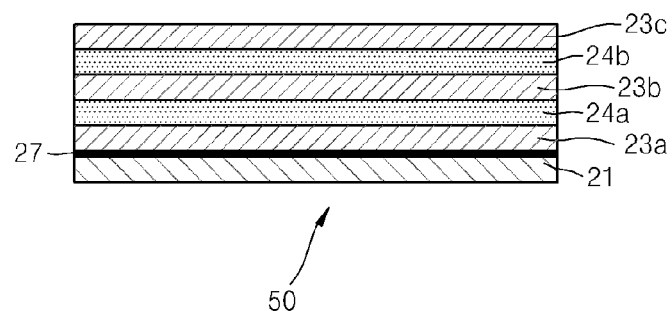

FIGS. 6-8 illustrate cross-sectional views of light absorbers according to example embodiments.

Referring to FIGS. 2 and 6-8, in FIG. 2, the light absorber 20 has a structure in which one thermistor layer 21 is sandwiched between the two resonator layers 22 and 23, however, light absorbers having various structures may be provided.

As shown in FIG. 6, a light absorber 30 may further include a dielectric layer 24 disposed between each of resonator layers 22 and 23 and a thermistor layer 21. For example, the dielectric layer 24 may be formed of an insulative material such as silicon oxide ($SiO_2$) or silicon nitride ($SiN_x$). Here, an insulation layer 27 may be disposed between the thermistor layer 21 and the dielectric layer 24 or between the dielectric layer 24 and each of the resonator layers 22 and 23. While the insulation layer 27 may electrically insulate the thermistor layer 21 from the resonator layers 22 and 23, the dielectric layer 24 may provide a sufficient space between the thermistor layer 21 and the resonator layers 22 and 23. For this, the dielectric layer 24 may have a thickness of about 50 nm to about 200 nm. As shown in FIG. 6, when each of the resonator layers 22 and 23 and the thermistor layer 21 are spaced apart from each other by the dielectric layer 23, light may be concentrated between the two resonator layers 22 and 23. Therefore, sufficient light absorption efficiency may be achieved even though each of the resonator layers 22 and 23 has a small thickness. For example, each of the resonator layers 22 and 23 may have a thickness of about 10 nm to about 100 nm. Although the two resonator layers 22 and 23 have the same thickness in the cross-sectional view of FIG. 6, the two resonator layers 22 and 23 may have different thicknesses according to a desired resonance characteristic.

As described above, when each of the resonator layers 22 and 23 has a small thickness, thermal mass may decrease. Thus, an amount that the temperature of the light absorber 30 varies (particularly, the thermistor layer 21) in response to light incident thereon may increase.

As shown in FIG. 7, a light absorber 40 according to another example embodiment may have a structure in which at least two thermistors and at least two resonator layers are alternately stacked with each other. For example, the light absorber 40 may include a first thermistor layer 21a disposed on a first resonator layer 21, a second resonator layer 23 disposed on the first thermistor layer 21a, a second thermistor layer 21b disposed on the second resonator layer 23, and a third resonator layer 25 disposed on the second thermistor layer 21b. Also, an insulation layer 27 may be disposed between each of the thermistor layers 21a and 21b and each of the resonator layers 22, 23, and 25. Although not shown in FIG. 7, dielectric layers 24 may be disposed between the first resonator layer 22 and the first thermistor layer 21a, between the first thermistor layer 21a and the second resonator layer 23, between the second resonator layer 23 and the second thermistor layer 21b, and/or between the second thermistor layer 21b and the third resonator layer 25. As the number of resonator layers 22, 23, and 25 increases, an infrared detector 10 may further increase with respect to a width of detectable bandwidth.

As shown in FIG. 8, a light absorber 50 according to another example embodiment may have a structure in which at least two resonator layers are successively stacked on one surface of a thermistor layer with at least one dielectric layers disposed between the at least two resonator layers. For example, as shown in FIG. 8, the light absorber 50 may include an insulation layer 27 disposed on an upper surface of a thermistor layer 21, a first resonator layer 23a disposed on an upper surface of the insulation layer 27, a first dielectric layer 24a disposed on the first resonator layer 23a, a second resonator layer 23b disposed on the first dielectric layer 24a, a second dielectric layer 24b disposed on the second resonator layer 23b, and a third resonator layer 23c disposed on the second dielectric layer 24b.

Additionally, the at least two resonator layers may be stacked in various other configurations of a light absorber in addition to the light absorbers 20, 30, 40, and 50 of FIGS. 2 and 6 to 8.

Operation of the Infrared Detector

Hereinafter, an operation of the infrared detector 10 having the above-described structure will be schematically described with reference to FIGS. 1 and 2.

When an electromagnetic wave having an infrared wavelength band (e.g., spanning about 8 μm to about 14 μm) to be detected is incident into the infrared detector 10, the surface plasmon resonance (SPR) may occur in the at least two resonators 22 and 23 within the light absorber 20 by energy of the electromagnetic wave. Thus, the energy of the electromagnetic wave may be absorbed into the light absorber 20. The remaining electromagnetic waves that are not absorbed into the at least two resonators 22 and 23 may be reflected by the reflective plate 15 and then may be incident again into the light absorber 20 to increase absorption efficiency.

When the SPR occurs in the resonators 22 and 23, heat may be generated. Thus, the temperature of the thermistor layer 21 in contact with the resonator layers 22 and 23 may increase. The thermistor layer 21 may vary in resistance due to the temperature change. The resistance of the thermistor layer 21 may be measured through the thermal legs 13a and 13b. For example, when a voltage is applied between the two thermal legs 13a and 13b, current flowing between the two thermal legs 13a and 13b may vary according to the resistance of the thermistor layer 21. Thus, the driving circuit (not shown) disposed on the substrate 11 may measure the current flowing between the two thermal legs 13a and 13b to measure the intensity of the infrared ray incident into the infrared detector 10.

Figure 9:
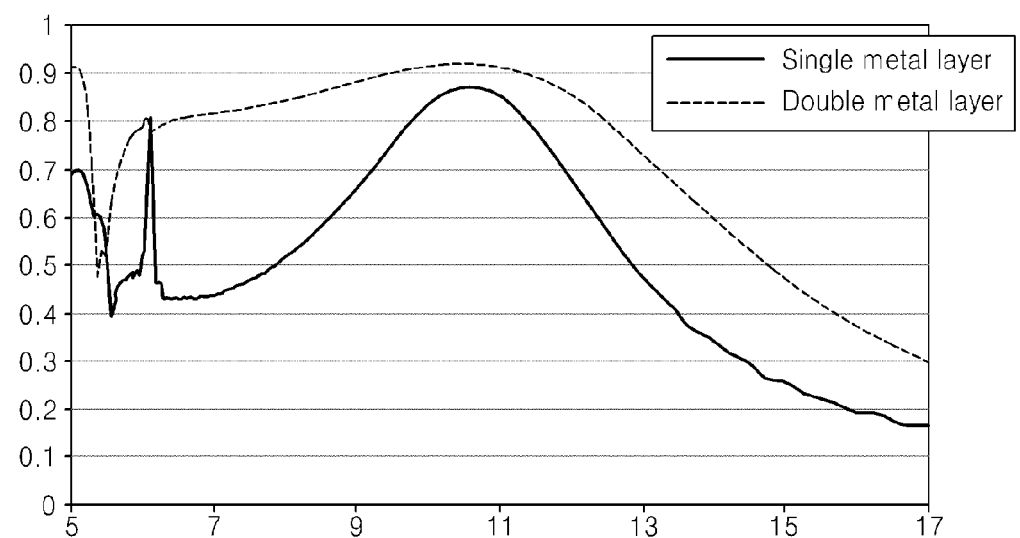
FIG. 9 is a graph illustrating an example of an infrared absorption spectrum of an infrared detector according to an example embodiment.

FIG. 9 is a graph illustrating an example of an infrared absorption spectrum of an infrared detector according to an example embodiment.

As illustrated in FIG. 9, a solid line graph represents an absorption spectrum of a conventional light absorber including only one resonator layer. Further, as illustrated in FIG. 9, a dotted line graph represents an absorption spectrum of the light absorber 20 including the two resonator layers 22 and 23 according to one or more example embodiments. In FIG. 9, it is assumed that each of the resonator layers 22 and 23 is formed of titanium (Ti).

Referring to FIG. 9, when compared to the light absorber including only one resonator layer, it is seen that the light absorber 20 has a relatively uniform absorption rate within the wavelength band spanning about 8 μm to about 14 μm. Since the light absorber 20 has various resonant frequencies, the infrared detector 10 may obtain relatively high detection characteristics in a wide infrared wavelength band. Therefore, the infrared detector 10 including the light absorber 20 may detect infrared rays at high efficiency within the wavelength band spanning about 8 μm to about 14 μm.

The above-described infrared detector 10 may be used for infrared thermal cameras in which a plurality of unit pixels are arranged in a two-dimensional array. Alternatively, the infrared detector 10 may be used for infrared detection sensors or thermal sensors that have only one unit pixel structure.

Thus far, for ease of understanding, example embodiments with respect to the infrared detector including the broadband light absorber have been described with reference to the accompanying drawings. However, these example embodiments are merely illustrative of the disclosure, and thus should not be construed as limiting to the scope of the present invention. It is to be understood that the present invention is not limited to the embodiments as described above, as there may be variations and modifications made by those skilled in the art.

What is claimed is:

1. An infrared detector comprising:
   a substrate;
   a light absorber disposed apart from the substrate at a distance; and
   a pair of thermal legs configured to support the light absorber such that the light absorber is spaced apart from the substrate by the distance, the light absorber including,
      at least one thermistor layer having a resistance value that varies according to a temperature,
      at least two resonator layers disposed on at least one of an upper surface and a lower surface of the at least one thermistor layer, each of the at least two resonator layers being patterned in a shape such that the at least two resonator layers have at least two resonant parts configured to absorb light having resonant frequencies, the at least two resonant parts having different resonant modes, and
      an insulation layer disposed between the at least one thermistor layer and each of the at least two resonator layers.

2. The infrared detector of claim 1, further comprising:
   a reflective plate disposed on a surface of the substrate such that the reflective plate faces the light absorber, the reflective plate configured to reflect incident electromagnetic waves.

3. The infrared detector of claim 1, further comprising:
   a pair of support members that vertically protrude from the substrate, wherein
      first ends of the pair of thermal legs are respectively connected in a cantilever shape to upper portions of the pair of support members, and
      second ends of the pair of thermal legs are respectively connected to the light absorber.

4. The infrared detector of claim 3, wherein the pair of thermal legs are respectively connected to at least two sides of the light absorber.

5. The infrared detector of claim 1, wherein the at least one thermistor layer is formed of at least one of amorphous silicon, vanadium oxide, nickel oxide, and Si—Ge.

6. The infrared detector of claim 1, wherein each of the at least two resonator layers comprises:
   a metal thin film formed of one of Gold (Au), Silver (Ag), Platinum (Pt), Copper (Cu), Aluminum (Al), Titanium (Ti), or an alloy thereof.

7. The infrared detector of claim 1, wherein a thickness of each of the at least two resonator layers is 10 nm to 100 nm.

8. The infrared detector of claim 1, further comprising:
   a dielectric layer additionally disposed between the at least one thermistor and each of the at least two resonator layers.

9. The infrared detector of claim 8, wherein a thickness of the dielectric layer is 50 nm to 200 nm.

10. The infrared detector of claim 1, wherein the light absorber comprises:
    one thermistor layer;
    a first resonator layer disposed on a lower surface of the thermistor layer;
    a second resonator layer disposed on an upper surface of the thermistor layer;
    a first insulation layer disposed between the first resonator layer and the thermistor layer; and
    a second insulation layer disposed between the second resonator layer and the thermistor layer.

11. The infrared detector of claim 10, wherein the light absorber further comprises:
    a first dielectric layer disposed between the thermistor layer and the first resonator layer; and
    a second dielectric layer disposed between the thermistor layer and the second resonator layer.

12. The infrared detector of claim 1, wherein the at least one thermistor layer and each of the at least two resonator layers have a same shape.

13. The infrared detector of claim 1, wherein the at least one thermistor layer and each of the at least two resonator layers have different shapes.

14. The infrared detector of claim 1, wherein the light absorber comprises:
    at least two thermistor layers; and
    at least two resonator layers stacked alternately with the at least two thermistor layers.

15. The infrared detector of claim 1, wherein the light absorber comprises:
    one thermistor layer having an upper surface and a lower surface; and
    at least two resonator layers, a first one of the two resonator layers being stacked on the upper surface and a second one of the at least two resonator layers being stacked on the lower surface.

16. The infrared detector of claim 15, wherein the light absorber further comprises:
    at least one dielectric layer disposed between the at least two resonator layers.

17. The infrared detector of claim 1, wherein the at least two resonator layers have a same thickness.

18. The infrared detector of claim 1, wherein the at least two resonator layers have different thicknesses.

19. The infrared detector of claim 1, wherein the at least two resonator layers have a same shape.

20. The infrared detector of claim 1, wherein the at least two resonator layers have different shapes.

21. An infrared detector comprising:
    a substrate;
    a light absorber disposed apart from the substrate at a distance; and
    a pair of thermal legs configured to support the light absorber such that the light absorber is spaced apart from the substrate by the distance, the light absorber including,
       a first resonator layer,
       a first thermistor layer disposed on the first resonator layer,
       a second resonator layer disposed on the first thermistor layer,
       a second thermistor layer disposed on the second resonator layer,
       a third resonator layer disposed on the second thermistor layer,
       a first insulation layer disposed between the first resonator layer and the first thermistor layer, a second insulation layer disposed between the first thermistor layer and the second resonator layer, a third insulation layer disposed between the second resonator layer and the second thermistor layer, and a fourth insulation layer disposed between the second thermistor layer and the third resonator layer.

22. An infrared detector comprising:

a substrate;

a light absorber disposed apart from the substrate at a distance; and a pair of thermal legs configured to support the light absorber such that the light absorber is spaced apart from the substrate by the distance, the light absorber including, a thermistor layer having a resistance value that varies according to a temperature, an insulation layer disposed on an upper surface of the thermistor layer, a first resonator layer disposed on an upper surface of the insulation layer, a first dielectric layer disposed on the first resonator layer, a second resonator layer disposed on the first dielectric layer, a second dielectric layer disposed on the second resonator layer, and a third resonator layer disposed on the second dielectric layer.

* * * * *